United States Patent [19]
Asano et al.

[11] Patent Number: 5,707,406
[45] Date of Patent: Jan. 13, 1998

[54] METHOD OF MANUFACTURING ALUMINUM FLUORIDE ANHYDRIDE

[75] Inventors: Motohiko Asano, Funabashi; Masahiro Numata, Abiko; Koji Okamoto, Sakura; Takashi Goda, Chiba, all of Japan

[73] Assignee: Onoda Chemical Industry Co., Ltd., Tokyo, Japan

[21] Appl. No.: 791,931

[22] Filed: Jan. 29, 1997

Related U.S. Application Data

[63] Continuation of Ser. No. 542,037, Oct. 12, 1995, abandoned, which is a continuation of Ser. No. 237,588, May 3, 1994, abandoned.

[30] Foreign Application Priority Data

May 6, 1993 [JP] Japan ..................... 5-127750

[51] Int. Cl.$^6$ ...................................... C01B 9/08
[52] U.S. Cl. ..................... 23/301; 23/305 A; 423/489
[58] Field of Search ................. 23/305 A, 301; 423/489, 495

[56] References Cited

U.S. PATENT DOCUMENTS

| | | | |
|---|---|---|---|
| 1,797,994 | 3/1931 | Morrow | 423/489 |
| 2,801,907 | 8/1957 | Scott | 23/301 |
| 3,057,681 | 10/1962 | Gernes | 23/305 A |

FOREIGN PATENT DOCUMENTS

| | | |
|---|---|---|
| 88 080 | 2/1974 | German Dem. Rep. . |
| 139833 | 1/1980 | German Dem. Rep. ........ 423/489 |
| 248 349 A1 | 8/1987 | German Dem. Rep. . |
| 275 855 A1 | 2/1990 | German Dem. Rep. . |
| 45-36207 | 11/1970 | Japan . |
| 5-229817 | 9/1993 | Japan . |
| 782423 | 9/1957 | United Kingdom . |
| 1074665 | 7/1967 | United Kingdom . |

OTHER PUBLICATIONS

2nd International Congress on Phosphorous Compounds Proceeding, Apr. 21–25, 1980, Boston, USA pp. 799–808, J. Y. Morlock et al.
Perry, "Chemical Engineers' Handbook", Third edition, 1950, pp. 1050–1061.
Derwent abstract for: DD 248,349 (Aug. 1987).
Derwent abstract for: DD 275,855 (Feb. 1990).
Derwent abstract for: JP 5–229,817 (Sep. 1993).
Derwent abstract for: DD 88,080 (Feb. 1974).

*Primary Examiner*—Ngoc-Yen Nguyen
*Attorney, Agent, or Firm*—Frishauf, Holtz, Goodman, Langer & Chick, P.C.

[57] ABSTRACT

A method of manufacturing aluminum fluoride anhydride by means of a wet method. This method is featured in that a seed crystal of $AlF_3 \cdot 3H_2O$ containing not more than 5% of fine particle 40 μm or less in diameter is added into the super-saturated solution of aluminum fluoride in such a ratio that the total surface area of the seed crystal is in the range of 40–100 m$^2$ per 1 kg of $AlF_3 \cdot 3H_2O$ to be precipitated until an initial concentration of the super-saturated solution is reduced to 1.6%. The initial concentration of the super-saturated solution is adjusted to 8 to 15%. Resultant slurry is heated under agitation, thereby precipitating in batch-wise large $AlF_3 \cdot 3H_2O$ particles which are then separated, dried and dehydrated.

14 Claims, 2 Drawing Sheets

METHOD OF MANUFACTURING ALUMINUM FLUORIDE ANHYDRIDE

This application is a Continuation of application Ser. No. 08/542,037, filed Oct. 12, 1995, (abandoned) which is a continuation application of Ser. No. 08/237,588, filed May 3, 1994 (abandoned).

BACKGROUND OF THE INVENTION

1. Field of the Invention

This invention relates to a method of manufacturing aluminum fluoride anhydride, and more particularly to a method of effectively manufacturing aluminum fluoride anhydride having an average particle diameter of 100 μm or more by means of a wet method.

2. Description of the Related Art

Aluminum fluoride anhydride is very useful as a flux in electrolytic reduction of alumina, or as a raw material for ceramics such as an optical glass. As the manufacturing method of aluminum fluoride anhydride, there are known two methods. i.e. a dry method wherein anhydrous hydrogen fluoride is used as a source of fluorine for manufacturing aluminum fluoride anhydride, and a wet method wherein a fluosilicic acid solution or a hydrofluoric acid solution is used as a source of fluorine for manufacturing aluminum fluoride anhydride.

The aluminum fluoride anhydride which is obtained from the dry method contains 88 to 92% of aluminum fluoride, and has a bulk density of 1.5 to 1.6 g/cm$^3$, a shape of angular aggregated body similar to the raw aluminum hydroxide and a relatively large size, i.e. 80 to 100 μm in average particle diameter By contrast, aluminum fluoride anhydride to be obtained from the wet method has a content of aluminum fluoride which is higher than that obtainable by the dry method mentioned above, i.e. 95 to 98% as the aluminum fluoride anhydride according to the wet method is manufactured via an intermediate product of aluminum fluoride trihydrate. However, the aluminum fluoride anhydride manufactured by this wet method is porous, as pores are formed in the particle as a result of the dehydration of crystallization water during the manufacturing process, thereby lowering the bulk density of aluminum fluoride anhydride to about 0.8 g/cm$^3$.

Moreover, the shape of aluminum fluoride anhydride obtained from this wet method is poor in uniformity, as the particle of aluminum fluoride anhydride is formed through aggregation and crystal growth.

Thus, the size of the particle of aluminum fluoride anhydride generally ranges from 60 to 70 μm in average particle diameter, and is generally smaller than that of aluminum fluoride anhydride obtainable in the dry method mentioned above. Since the particles of aluminum fluoride anhydride obtained from the wet method are light and fine as mentioned above, there are pointed out many problems for using these particles of aluminum fluoride anhydride for flux in electrolytic reduction of alumina. For example, when the particles of aluminum fluoride anhydride obtained from the wet method are to be charged into an electric furnace for flux in electrolytic reduction of alumina, the fluidity of the particles of aluminum fluoride anhydride during pneumatic transportation occasionally becomes too poor to charge a predetermined amount of them into the furnace. There is another problem that the particles of aluminum fluoride anhydride charged into aluminum electrolyzing cell are easily scattered by the inner air stream within the furnace, and the particles thus scattered escape out of the furnace through an exhaust stream, thereby losing a relatively large amount of aluminum fluoride anhydride.

Due to these problems, it has been considered that the particles of aluminum fluoride anhydride to be obtained from the wet method are not suited for use in electrolytic reduction of alumina requiring a large amount of aluminum fluoride anhydride, and in fact the particles of aluminum fluoride anhydride obtained from the wet method have scarcely been utilized for the electrolytic reduction of alumina.

In view of handling and the prevention of generation of dust, if aluminum fluoride anhydride is to be used for electrolytic reduction of alumina, it is generally desired to use aluminum fluoride anhydride having an average particle diameter of 100 μm or more with the particles having 44 μm or less being controlled to not more than 1%. However, a technique of effectively producing, by way of a wet method, aluminum fluoride anhydride having a controlled particle size as mentioned above has not been available to date.

Fluosilicic acid, which is a raw material useful for producing aluminum fluoride anhydride by a wet method, is by-produced in large amount in the manufacture of phosphoric acid from for example phosphate rock. To date, this fluosilicic acid has been scarcely utilized, and mostly discarded as useless. However, in view of saving natural resources, and reducing environmental pollution, it is desired to find a way to utilize the fluosilicic acid.

For responding the need as mentioned above, there have been already proposed various methods to manufacture aluminum fluoride anhydride through a wet method. For example, East German Patent No. 88,080 describes a method of manufacturing aluminum fluoride anhydride wherein aluminum fluoride trihydrate is produced from a supersaturated aluminum fluoride solution, which is obtained by reacting fluosilicic acid with aluminum hydroxide. In this method the generation of fine particles during the step of calcination/dehydration are controlled to a minimum by controlling the agitation speed during the crystallization thereof. However, the method employed In this East German Patent uses no seed crystal, and moreover the crystallization is conducted only once, thus failing to effectively produce aluminum fluoride anhydride of large particle size.

East German Patent No. 248,349 describes a method of precipitating aluminum fluoride trihydrate of large particle size from a super-saturated solution of aluminum fluoride, the composition and concentration of the solution being controlled respectively to 3<F/Al≦6, and 1–2.5 mol/L or less. However this method is defective in that the yield of aluminum fluoride trihydrate is very low, i.e. 55%.

Further, U.S. Pat. No. 3,057,681 discloses a method of crystallizing $AlF_3 \cdot 3H_2O$ in a batch or continuous method from a super-saturated solution of aluminum fluoride, wherein the crystallization is performed by using a seed crystal, and fine particles contained in the resultant product are removed therefrom to re-use as a seed crystal.

In this U.S. Patent however, nothing is taught about the amount of particles to be used as a seed crystal, which is one of the very important crystallization factors, and, on the contrary, all of the fine particles settled in a thickener are re-used as a seed crystal for the subsequent crystallization process, thereby permitting a lot of fine particles to be produced in every crystallization step, thus raising a problem.

In view of this problem, the method proposed in this U.S. Patent is not suited for efficiently producing $AlF_3 \cdot 3H_2O$ of larger particle size, thereby making this technique difficult to adopt to the real industrial production of $AlF_3.3H_2O$.

SUMMARY OF THE INVENTION

An object of this invention is to provide a method of manufacturing $AlF_3.3H_2O$ of larger particle diameter in high efficiency from a super-saturated solution of aluminum fluoride by using a wet method and by utilizing, as a fluorine source, a by-product produced in the processing of phosphate rock. Another object of this invention is to provide a method of manufacturing aluminum fluoride anhydride having an average particle diameter of 100 μm or more, which is suited for utilization in electrolytic reduction of alumina.

Another object of this invention is to provides a method of manufacturing in high efficiency aluminum fluoride anhydride having a larger particle diameter.

According to this invention, there is provided a method of manufacturing aluminum fluoride anhydride, which comprises the steps of preparing a super-saturated solution of aluminum fluoride; adding into the super-saturated solution of aluminum fluoride m seed crystal of $AlF_3.3H_2O$ containing not more than 5% of fine particles of 40 μm or less in particle diameter in such a ratio that the total surface area of the seed crystal is in the range of 40–100 $m^2$ per 1 kg of $AlF_3.3H_2O$ to be precipitated during a time period between the moment of initiating crytallization and the moment where an initial concentration of the super-saturated solution of aluminum fluoride is reduced to 1.6%; adjusting the initial concentration of the super-saturated solution of aluminum fluoride to 8 to 15%; heating the resultant super-saturated solution of aluminum fluoride to a temperature ranging from 75° to 106° C.; maintaining the super-saturated solution of aluminum fluoride at this temperature under agitation, thereby allowing crystals to be precipitated from the super-saturated solution of aluminum fluoride through a batch crystallization method to obtain a slurry of $AlF_3.3H_2O$; separating $AlF_3.3H_2O$ having an average particle diameter of 100 μm or more from the slurry of $AlF_3.3H_2O$; drying the $AlF_3.3H_2O$ thus separated and dehydrating the $AlF_3.3H_2O$ thus dried.

According to this invention, there is further provide a method of manufacturing aluminum fluoride anhydride, wherein the $AlF_3.3H_2O$ having a relatively large particle diameter is separated from the slurry of $AlF_3.3H_2O$ in above-mentioned steps and re-used as a seed crystal, and the above-mentioned steps of producing the $AlF_3.3H_2O$ crystal are repeated until aluminum fluoride anhydride having a desired particle diameter is obtained.

According to this invention, there is further provided a method of manufacturing aluminum fluoride anhydride, wherein the seed crystal of $AlF_3.3H_2O$ containing not more than 5% of fine particle of 40 μm or less in particle diameter is used in a form of slurry. According to this invention, there is further provided a method of manufacturing aluminum fluoride anhydride, wherein the seed crystal of $AlF_3.3H_2O$ containing not more than 5% of fine particle of 40 μm or less in particle diameter is used in a form of filter cake of slurry.

According to this invention, the temperature of the super-saturated solution of aluminum fluoride may preferably be controlled to range from 85° to 95° C.

According to this invention, the step of precipitation is conducted under agitation so that the $AlF_3.3H_2O$ is not accumulated at the bottom of a crystallizer. According to this invention, the steps of obtaining $AlF_3.3H_2O$ crystal may be repeated until $AlF_3.3H_2O$ having a particle diameter of 100 μm or more occupies not less than 60% of whole $AlF_3.3H_2O$ produced.

Details of this invention will be more apparent from the following explanations.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Figure 1:
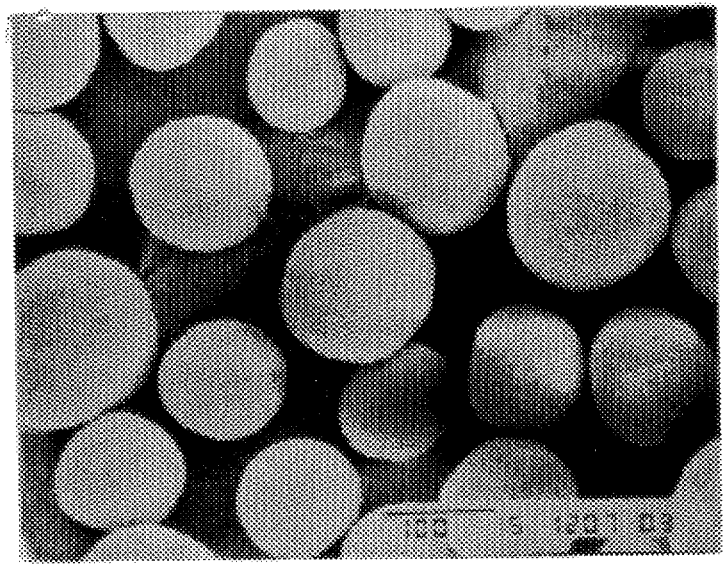
FIG. 1 is a scanning type electron microscopic photograph of aluminum fluoride particles having an average particle diameter of 128 μm as obtained by the present invention.

The inventors have made a detailed observation on the mechanism of crystal growth of $AlF_3.3H_2O$ in a super-saturated solution of aluminum fluoride in the process of achieving this invention. As a result, it has been confirmed by the inventors that the crystal growth of $AlF_3.3H_2O$ is proceeded by the lamination of a large number of fine $AlF_3.3H_2O$ crystals on the surface of an $AlF_3.3H_2O$ seed crystal.

It is more importantly confirmed that in the case of an aluminum fluoride solution which is higher in super-saturation degree, a large number of fine $AlF_3.3H_2O$ crystals are more actively laminated on the surface of an $AlF_3.3H_2O$ seed crystal, and the surface of an $AlF_3.3H_2O$ crystal after the growth is more excellent in smoothness. This is considered to be a unique phenomenon in the crystal growth of $AlF_3.3H_2O$ which is first discovered by the present inventors.

It has been generally considered according to the conventional knowledge about the crystallization that when the supersaturation degree of a solution is high, a large number of new crystals are generated in the solution, so that the growth of seed crystal added in advance thereto is greatly inhibited. Accordingly, the fact newly found by the inventors is considered to be a unique phenomenon peculiar to an aluminum fluoride solution of high super-saturation degree, which is quite different from what has been generally considered with regard to the crystal growth.

To be more specific, it has been found by the present inventors that, as far as the growth of $AlF_3.3H_2O$ seed crystal is concerned, when a solution of high super-saturation degree, for example a solution of an aluminum fluoride having a concentration of more then 8% is employed for the crystal growth, it is possible to obtain AlF$_3$.3H$_2$O crystal of large particle diameter. It has been confirmed upon observation of the cross-section of the AlF$_3$.3H$_2$O crystal of large particle diameter thus obtained that the growth of the crystal is extended radially and uniformly just like that of the annual ring of tree from the seed crystal forming a center core. It has been also confirmed that the surface of the crystal thus obtained is very smooth.

This invention is based on these new findings, and therefore the crystal growth is initiated using an aluminum fluoride solution of high concentration. The aluminum fluoride solution of high concentration to be used in this invention can be obtained by reacting aluminum hydroxide with fluosilicic acid. It is advantageous in this invention to carry out the crystallization by using a seed crystal of larger particle diameter, since the growth of seed crystal is effected by the lamination of a large number of fine AlF$_3$.3H$_2$O crystals. However, the employment of extremely large seed crystal may invite another problem that the production of such an extremely large seed crystal itself is rather difficult.

Therefore, AlF$_3$.3H$_2$O crystal containing not more than 5% of fine particle of 40 μm or less in particle diameter are employed as a seed crystal according to this invention. The reason for limiting the content of fine particle of 40 μm or less in particle diameter to 5% or less is that if a lot of such a fine particle is included in the seed crystal, a large amount of aluminum fluoride in the super-saturated solution is consumed for the growth of the fine particle, thereby inhibiting the effective growth of AlF$_3$.3H$_2$O of larger particle size.

There is no other requirement for the seed crystal to be useful in this invention as long as the above requirements for a seed crystal are met. However, it is more preferable to employ a seed crystal containing not more than 5% of fine particle of 50 μm or less in particle diameter.

As a method of removing fine particles of 40 μm or less in particle diameter, a method employing a hydraulic classifier, or a method utilizing a decantation may be adopted. As a seed crystal, either AlF$_3$.3H$_2$O crystals to be produced from a super-saturated solution of aluminum fluoride without using a seed crystal, or AlF$_3$.3H$_2$O crystals to be produced from a super-saturated solution of aluminum fluoride by using a seed crystal may be used.

The average particle diameter of AlF$_3$.3H$_2$O crystals to be produced from a super-saturated solution of aluminum fluoride without using a seed crystal is generally in the range of 70 to 80 μm. However, these particles may be treated so as to be useful as a seed crystal by selectively removing fine particles therefrom to obtain a crystal of AlF$_3$.3H$_2$O containing not more than 5% of fine particles of 40 μm or lees in particle diameter. There is no limitation as to the average particle diameter of the seed crystal useful in this invention. When a seed crystal of large size is employed, crystals of larger size may be naturally obtained. If it is desired to obtain a large crystal having a particle diameter of about 100 μm in one crystallizing process, the use of a seed crystal having an average particle diameter of about 80 μm is required.

According to this invention, a seed crystal of AlF$_3$.3H$_2$O is added to a super-saturated solution of aluminum fluoride in such a weight ratio that when the amount of the seed crystal is converted to the total surface area of the seed crystal, it corresponds to the range of 40–100 m$^2$ per 1 kg of AlF$_3$.3H$_2$O to be precipitated during a time period between a moment of initiating the crystallization and a moment where an initial concentration of the super-saturated solution of aluminum fluoride is reduced to 1.6%. At the same time, the initial concentration of the super-saturated solution of aluminum fluoride is adjusted to 8 to 15%.

Namely, when the concentration of super-saturated solution of aluminum fluoride and the amount of the super-saturation solution is determined, the amount of AlF$_3$.3H$_2$O to be crystallized during a time period between a moment of initiating the crystallization and a moment where an initial concentration of the super-saturated solution of aluminum fluoride is reduced to 1.6% is naturally determined. Accordingly, a seed crystal of AlF$_3$.3H$_2$O is added to a super-saturated solution of aluminum fluoride in such a weight ratio that when the amount of the seed crystal is converted to the total surface area of the seed crystal, it falls in the range of 40–100 m$^2$ per 1 kg of AlF$_3$.3H$_2$O to be precipitated. In this case, the initial concentration of the super-saturated solution of aluminum fluoride is adjusted to range from 8% to 15%. The terms of the initial concentration of the super-saturated solution of aluminum fluoride is meant herein a concentration as measured after the seed crystal is added to the super-saturated solution of aluminum fluoride.

It is required in this invention to adjust the concentration of super-saturated solution of aluminum fluoride at the initiation of crystallization to range from 8% to 15%, and at the same time it is important to select the amount of seed crystal to be added to the super-saturated solution.

It is also required in order to effectively crystallize AlF$_3$.3H$_2$O of such a large particle size as intended according to this invention to have both of the concentration of the super-saturated solution of aluminum fluoride and the amount of the seed crystal to be added in the super-saturated solution of aluminum fluoride satisfying the conditions mentioned above. In other words, it is impossible to effectively crystallize AlF$_3$.3H$_2$O of such a large particle size as intended according to this invention if only one of the conditions is met. If the concentration of the super-saturated solution of aluminum fluoride is lower than 8%, a crystal having a large number of columnar or needle-like crystal attached on its seed crystal can be obtained. Additionally, under such a condition of low concentration, the crystals which have been precipitated may impinge upon one another, or impinge against the wall of a crystallizer causing a stripping of columnar or needle-like crystal, thereby inhibiting the growth of excellent crystals.

On the other hand, if the concentration of super-saturated solution of aluminum fluoride at the initiation of crystallization exceeds 15%, it will give rise to the generation of a large number of new nuclei due to the excessive concentration of the super-saturated solution. If a large number of new nuclei are generated, an efficient crystal growth of seed crystal is no longer possible. By limiting the initial concentration of the super-saturated solution of aluminum fluoride at the initiation of crystallization to range from 8% to 15%, it is possible to obtain AlF$_3$.3H$_2$O crystals which are high in density and smoother in surface texture. It is more preferable to limit the initial concentration of the super-saturated solution of aluminum fluoride at the moment of the initiation of crystallization to range from 9% to 13%.

When the total surface area of the seed crystal to be added to the super-saturated solution is smaller than 40 m$^2$ per 1 kg of AlF$_3$.3H$_2$O to be precipitated, the quantity of the seed crystal is too little in relative to the quantity of the super-saturated solution thereby permitting a large number of additional new crystal nuclei to be generated. Further, in this case, the amount of newly precipitated crystal to be shared to the growth of fine particles 40 μm or less will exceed 10%. If the amount of newly precipitated crystal to be shared to the growth of fine particles 40 μm or less exceeds over 10%, it is no longer possible to efficiently obtain crystal of larger size. In addition to that, it also gives rise to a new problem of the disposal of a large number of fine particles to be generated during the precipitation step.

Furthermore, if the total surface area of the seed crystal to be added to the super-saturated solution exceeds over 100 $m^2$ per 1 kg of $AlF_3.3H_2O$ to be precipitated, the generation of new crystal nuclei becomes constant so that any increase in surface area exceeding this upper limit is no longer effective in inhibiting the generation of new crystal nuclei. Also, the magnitude of crystal growth of seed crystal in one crystallization process in this case is minimized, and the concentration of solid materials within a crystallizer is so increased as to make the operation of crystallization process difficult to continue, thereby raising another problem.

The total surface area of a seed crystal is determined from a measured value of particle size distribution, or from a value calculated from an average particle diameter.

The seed crystal may be added to a super-saturated solution of aluminum fluoride either in the form of slurry, which can be produced by removing a sufficient amount of fine particles from a slurry obtained upon finishing the crystallization until the slurry no longer contains more than 5% of fine particles 40 μm or less in particle diameter, and then concentrating the slurry to such an extent that the slurry contains 30% or more of $AlF_3.3H_2O$, or in the form of filter cake, which can be obtained by filtering the last-mentioned slurry.

The crystallization of the super-saturated solution of aluminum fluoride is carried out by heating the solution to a temperature ranging from 70° C. to 106° C., which is a boiling point of aluminum fluoride solution. The crystallization may proceed even if the temperature of the solution is lower than 70° C., but the rate of crystallization is low and inadvisable in view of the productivity. The upper limit in temperature is the boiling point of aluminum fluoride solution as mentioned above. In one embodiment, the temperature for carrying out the crystallization of the solution is in the range of from 85° C. to 95° C. This heating can be conducted by the conventional method, for example by blowing a heated steam into the solution.

The growing of the seed crystal is performed while agitating the heated super-saturated solution of aluminum fluoride. This agitation is conducted for preventing $AlF_3.3H_2O$ from accumulating at the bottom of a crystallizer drum. When a flat-blade type agitator is to be employed, the agitation may be conducted by using an agitating blade having a length 0.6 to 0.9 times as long as the diameter of a crystallizer, at the blade-tip velocity of 0.4 to 3 m/sec., more preferably 0.7 to 2 m/sec. If the agitation is too vigorous, the crystals of $AlF_3.3H_2O$ may impinge upon each other so as to generate a large number of secondary nuclei. Therefore, it is advisable to avoid a vigorous agitation.

The method of agitation is not limited to the use of afore-mentioned flat-blade type agitator, but can be selected from various methods, i.e. such as those using other kind of agitation blade, or those utilizing a foam-blowing agitation. It is advisable in any of the agitation methods to perform the agitation in such a manner as to avoid the accumulation of $AlF_3.3H_2O$ at the bottom of a crystallizer. If $AlF_3.3H_2O$ is accumulated at the bottom of a crystallizer, the accumulated $AlF_3.3H_2O$ becomes a big block and adheres to the bottom of the crystallizer.

The time period required for the crystallization is dependent on the amount of seed crystal employed, the concentration of the solution, the temperature of crystallization, and so on, but generally ranges from 3 to 6 hours.

In subsequent to the crystallization process of the solution, particles of larger particle size exceeding 40 μm in particle diameter are separated from particles of fine particle size 40 μm or less in the resultant slurry. This separation can be performed by using the conventional wet type classifier. In another method, this separation may be conveniently performed by utilizing a decantation. The $AlF_3.3H_2O$ particles of larger particle size thus separated are then subjected to filtration, drying and dehydration.

The filtration can be conducted by using for example a centrifugal separator. Then, the drying is conducted at a temperature of 100° to 150° C. The dehydration is conducted for removing crystallization water from $AlF_3.3H_2O$. As a method of dehydration, either a single-step method wherein the temperature of $AlF_3.3H_2O$ is raised in a single step up to 600° C., or a two-step method wherein the temperature of $AlF_3.3H_2O$ is raised in the first step to about 300° C. thereby removing most of crystallization water, and then the temperature is raised in the second step up to 600° C. to remove remainder of crystallization water may be employed.

By finishing these steps, it is possible to ultimately obtain aluminum fluoride anhydride of larger crystal size. According to another method of this invention, the above-mentioned processes are performed under the same conditions as explained above as a first step.

Namely, the processes of preparing a super-saturated solution of aluminum fluoride; adding into the super-saturated solution of aluminum fluoride a seed crystal of $AlF_3.3H_2O$ containing not more than 5% of fine particle of 40 μm or less in particle diameter in such a ratio that the total surface area of the seed crystal is in the range of 40–100 $m^2$ per 1 kg of $AlF_3.3H_2O$ to be precipitated during a time period between a moment initiating a crystallization and a moment where an initial concentration of the super-saturated solution of aluminum fluoride is reduced to 1.6%; adjusting the initial concentration of the super-saturated solution of aluminum fluoride to 8 to 15%; heating the resultant super-saturated solution of aluminum fluoride to a temperature ranging from 75° to 106° C.; maintaining the super-saturated solution of aluminum fluoride at this temperature under agitation, thereby allowing crystal to be precipitated from the super-saturated solution of aluminum fluoride through a batch crystallization method are repeated.

In this case, the seed crystal of $AlF_3.3H_2O$ employed in this first step is hereinafter referred to as a primary seed crystal, and this first crystallization step is hereinafter referred to as a primary crystallization.

An $AlF_3.3H_2O$ crystal is separated from the slurry obtained from the primary crystallization, and processed to obtain a secondary seed crystal containing, as in the case of the primary seed crystal, not more than 5% of fine particle having a particle diameter of 40 μm or less.

The secondary crystallization is performed using the secondary seed crystal under the same conditions as in the case of the primary crystallization. Further, a $AlF_3.3H_2O$ crystal is separated from the slurry obtained from the secondary crystallization, and processed to obtain a tertiary seed crystal containing, as in the case of the secondary seed crystal, not more than 5% of fine particle having a particle diameter of 40 μm or less. Subsequently, the tertiary crystallization is performed using the tertiary seed crystal under the same conditions as those in the secondary crystallization.

Likewise, a $AlF_3.3H_2O$ crystal is separated from the slurry obtained from the previous crystallization, and processed to obtain a new seed crystal. Subsequently, another crystallization is additionally performed using this crystal under the same conditions as those in the previous crystallization. By repeating these crystallizing processes, it is possible to gradually enlarge the particle size of $AlF_3.3H_2O$ to be obtained from the slurry of $AlF_3.3H_2O$. It is preferable in this invention to repeat these crystallization processes at least once in subsequent to the primary crystallization. If these crystallization processes are repeated three times or more, preferably four times or more, it is possible to obtain an $AlF_3.3H_2O$ crystal having an average particle diameter of 100 μm or more, which is large enough for a practical use. It is preferable to repeat these crystallization processes until not less than 60% of $AlF_3.3H_2O$ to be crystallized becomes 100 μm or more in particle diameter.

After the final crystallization process is finished, an $AlF_3.3H_2O$ crystal having an average particle diameter of 100 μm or more is separated in the same manner as explained above from the slurry of $AlF_3.3H_2O$, and is then dried and dehydrated in the same manner as explained above thereby to obtain aluminum fluoride anhydride of large particle size.

Even in this method of obtaining an $AlF_3.3H_2O$ crystal of large particle size by repeating the crystallization processes, it is possible to utilize as a seed crystal a slurry of $AlF_3.3H_2O$ obtained as a result of crystallization, or to utilize a filter cake thereof. The temperature for carrying out the crystallization of the super-saturated solution of aluminum fluoride is preferably in the range of 85° to 95° C.

When a crystal of spherical shape is employed as a seed crystal, an $AlF_3.3H_2O$ crystal to be obtained after crystallization is also spherical in shape, and therefore excellent in fluidity in a transportation route and easy in handling. An example of the conditions for obtaining a spherical $AlF_3.3H_2O$ seed crystal is as follows.

The concentration of the super-saturated solution of aluminum fluoride should be 8% or more; the temperature of the solution during the crystallization should be 70° C. or more, preferably 85° C. to 100° C.; and the crystallization is conducted for 4 to 6 hours thereby to obtain a slurry. The slurry is then subjected to a classification process thereby removing fine particles to obtain a spherical $AlF_3.3H_2O$ seed crystal.

The agitation in this case is performed at the blade-tip velocity of 0.4 to 3 m/sec., more preferably 0.7 to 2 m/sec., if a flat-blade type agitator is employed. Other conditions including the method of recovering $AlF_3.3H_2O$ from a slurry in subsequent to the crystallization are the same as mentioned hereinabove. The particle diameter of aluminum fluoride anhydride obtained after drying and dehydrating $AlF_3.3H_2O$ particles should preferably be as such that includes not more than 1% of fine particles which have been passed through a 44 μm sieve. By limiting the content of the fine particle as mentioned above in the final product, it has become possible to substantially inhibit the generation of dust when the final product is transportated.

This invention will be further explained with reference to the following experiments. In this experiments, the super-saturated solution of aluminum fluoride was prepared by mixing together a super-saturated solution of aluminum fluoride having a concentration of 17% and a solution of aluminum fluoride having a concentration of 1.3%. The separation of fine particles from $AlF_3.3H_2O$ slurry after the crystallization, and the measurement of particle size distribution were conducted as follows.

(Preparation of the super-saturated solution of aluminum fluoride)

1500 g of fluosilicic acid solution containing 20% of $H_2SiF_6$ was charged into a plastic wide-mouthed bottle having an inner volume of 2000 cm³, and then the plastic bottle was settled in a water bath maintained at the temperature of 95° C. Then, the fluosilicic acid solution was subjected to agitation by using a flat-blade type agitator having a blade length of 8 cm and at the blade-tip velocity of 1.3 m/sec. when the temperature of the solution within the plastic bottle was raised up to 70° C., 323 g of aluminum hydroxide containing 98% of $Al(OH)_3$ was added to the solution over a period of 5 minutes. 20 minutes after the initiation of the addition of aluminum hydroxide, a solid material was separated by filtering. The filtered solid material was then washed twice with a 250 g of hot water, thereby obtaining a filtrate and a wash liquid. The concentration of the resultant super-saturated solution of aluminum fluoride was 17%.

(Method of separating large particles and fine particles)

Particles having a particle diameter exceeding 40 μm are herein defined as large particles (simply referred to as "large particles" in the following experiments and (Examples), and particles having a particle diameter of 40 μm or less are herein defined as fine particles (simply referred to as "fine particles" in the following experiments and Examples).

The separation of fine particles was conducted by using a hydraulic classifier. The velocity of the upward flow at the overflowing portion of the hydraulic classifier was set to 0.93 mm/sec. The temperature of the liquid was 25° C., the density of the liquid was 1.02 g/cm³, and the viscosity of the liquid was 0.01 g/cm.sec. Further, the density of $AlF_3.3H_2O$ in the separated liquid was 2.09 g/cm³. The density of solid material in the classifier was set to about 5%, and the time of the separation was set to 20 minutes.

(Measurement of particle size distribution and Calculation of average particle diameter)

The measurement of particle size distribution was conducted by using a granulometer, HR-850 (Cilas-, Alcatel Co. Ltd. ). The average particle diameter was indicated by the value of a particle diameter which corresponds to 50% in the particle size distribution. The measurement of particle size distribution of aluminum fluoride anhydride was conducted by sieve.

EXPERIMENT NO. 1

(Concentration of a super-saturated solution )

Various kinds of solutions each differing in the concentration of aluminum fluoride from one another were prepared by mixing together a super-saturated solution of aluminum fluoride having a concentration of 17% and a solution of aluminum fluoride having a concentration of 1.3%. With these super-saturated solutions of aluminum fluoride, the growth of seed crystal was conducted under the following conditions.

| Crystallizing conditions: | |
| --- | --- |
| Crystallizer: | Polyethylene wide-mouthed bottle (Volume: 1000 cm³, diameter: 9 cm) |
| Agitator: | Flat-blade type agitator (blade length: 8 cm) |
| Blade-tip velocity: | 1.3 m/sec. |
| Temperature of solution: | 93° C. |
| Crystallizing time: | 5 hours |

-continued

| Crystallizing conditions: | |
|---|---|
| AlF₃ super-saturated solution: | 600 g (Concentration is indicated in Table 1) |
| Particle diameter of seed crystal: | 89 μm in average diameter |
| Amount of seed crystal: | 75 m² in surface area per 1 kg of $AlF_3 \cdot 3H_2O$ to be precipitated. The surface area is calculated from the average particle diameter of seed crystal. |

The slurry of $AlF_3 \cdot 3H_2O$ resulting from the crystallization was subjected to classifying treatment to separate large particles from fine particles, and each of the particles were filtered thereby recovering each of them. The large particles thus obtained were observed with a scanning type electron microscope to determine the feature of the particle. Results are shown in Table 1.

The concentration of the super-saturated solution of aluminum fluoride at the initiation of the crystallization was determined by measuring the volumes of a super-saturated solution of aluminum fluoride having a concentration of 17% and a solution of aluminum fluoride having a concentration of 1.3%, and by calculating water attached to the seed crystal. The amount of newly precipitated $AlF_3 \cdot 3H_2O$ was determined by measuring the amount of $AlF_3 \cdot 3H_2O$ to be precipitated during a time period between a moment of initiation of crystallization and a moment where the concentration of aluminum fluoride in the mother liquor after crystallization (a liquid which is left after the removal of $AlF_3 \cdot 3H_2O$) is reduced to 1.6%. The symbols noted on the surface feature of crystal and on the generation of fine particles in the column of judgment in Table 1 were based on the criteria indicated on the margin of Table 1. The symbols noted on the summary in the column of judgment were determined as follows. Namely, if both of the surface feature of crystal and the generation of fine particles were marked with the symbol of a double circles, the judgment of the summary was marked with a double circle, if either the surface feature of crystal or the generation of fine particles was marked with the symbol of X, the judgment of the summary was marked with X, and if one of the surface feature of crystal and the generation of fine particles was marked with the symbol of double circle, and the other is marked with the symbol of single circle, the judgment of the summary was marked with a single circle. The same marking system as explained above was adopted also in the following tables.

Surface feature:

⊚ ... Growth of columnar or needle-like crystal was not admitted at all on the surface of seed crystal.

○ ... Growth of fine columnar crystal was slightly admitted on the surface of seed crystal.

X ... A lot of needle-like crystals were admitted on the surface of seed crystal.

Generation of fine particles:

⊚ ... Amount of classified fine particles of 40 μm or less was 5% or less based on the total amount of newly precipitated crystal.

○ ... Amount of classified fine particles of 40 μm or less was more than 5% and not more than 10% based on the total amount of newly precipitated crystal.

X ... Amount of classified fine particles of 40 μm or less was more than 10% based on the total amount of newly precipitated crystal.

As apparent from Table 1, when the concentration of super-saturated solution of aluminum fluoride at the initial moment of crystallization was in the range of from 8.0 to 16.4%, the generation of needle-like crystal was hardly recognized on the surface of seed crystal, and at the same time only a little amount of columnar crystal was admitted on the surface of seed crystal. Further, if the concentration of super-saturated solution of aluminum fluoride at the initial moment of crystallization was in the range of from 8.0 to 14.9%, the generation of fine particles was very limited, and a lot of excellent crystals were obtained.

EXPERIMENT NO. 2

(Amount of seed crystal)

A super-saturated solution of aluminum fluoride having a concentration as indicated below was prepared by mixing together a super-saturated solution of aluminum fluoride having a concentration of 17% and a solution of aluminum fluoride having a concentration of 1.3%. With this super-saturated solution of aluminum fluoride, the growth of seed crystal containing not more than 5% of fine particle of 40 μm or less in particle diameter was conducted by changing the amount of seed crystal as shown in the following Table 2. Other crystallizing conditions were selected as follows.

TABLE 1

| | Initial | Judgment | | |
|---|---|---|---|---|
| No. | Concentration of AlF₃ Super-saturated Solution (%) | Surface Feature | Generation of Fine Particle | Summary |
| 1 | 4.3 | X | X | X |
| 2 | 6.1 | X | ○ | X |
| 3 | 8.0 | ○ | ⊚ | ○ |
| 4 | 8.9 | ⊚ | ⊚ | ⊚ |
| 5 | 10.1 | ⊚ | ⊚ | ⊚ |
| 6 | 11.4 | ⊚ | ⊚ | ⊚ |
| 7 | 12.9 | ⊚ | ⊚ | ⊚ |
| 8 | 14.9 | ⊚ | ○ | ○ |
| 9 | 16.4 | ⊚ | X | X |

| Crystallizing conditions: | |
|---|---|
| Crystallizer: | the same as in Experiment No. 1 |
| Temperature of solution: | 93° C. |
| Crystallizing time: | 5 hours |
| Initial concentration of | |
| AlF₃ super-saturated solution: | 11.4% |
| AlF₃ super-saturated solution: | 417 g |
| Particle diameter of seed crystal: | 89 μm in average diameter |

The slurry of $AlF_3 \cdot 3H_2O$ resulting from the crystallization was subjected to classifying treatment to separate large particles from fine particles, and each of the particles were filtered thereby recovering each of them. Results are shown in Table 2.

TABLE 2

| No. | Amount of Seed Crystal Surface Area* ($m^2/kg$) | Amount of Seed Crystal Weight (g) | Crystallization Ratio (%) | Average Particle Diameter Crystal Material (μm) | Average Particle Diameter Diameter of Large Particle (μm) | Share of Crystallization For Growth of Seed Crystal (%) | Share of Crystallization For Generation of Fine Particle (%) | Judgement Generation of Fine Particle | Concentration of Solid In Slurry Initial concentration (%) | Concentration of Solid In Slurry Final Concentration (%) |
|---|---|---|---|---|---|---|---|---|---|---|
| 10 | 25 | 53.4 | 87.6 | 10 | 114 | 84.1 | 15.9 | × | 11.4 | 26.0 |
| 11 | 40 | 85.5 | 88.7 | 105 | 107 | 92.1 | 7.9 | ○ | 17.0 | 30.7 |
| 12 | 50 | 106.9 | 88.9 | 103 | 105 | 95.3 | 4.7 | ⊚ | 20.4 | 33.6 |
| 13 | 75 | 160.3 | 89.4 | 10 | 100 | 96.9 | 3.1 | ⊚ | 27.8 | 39.7 |
| 14 | 100 | 213.8 | 90.2 | 98 | 98 | 97.6 | 2.4 | ⊚ | 33.9 | 44.8 |
| 15 | 125 | 267.2 | 90.3 | 96 | 96 | 97.7 | 2.3 | ⊚ | 39.1 | 49.1 |

*Surface area: An amount of seed crystal par 1 kg of newly precipitated $AlF_3.3H_2O$ which is represented by the total surface area thereof.
**Crystallization ratio: The crystallization ratio is calculated from the chemical analysis of Al in the super-saturated solution of $AlF_3$ at the moment of starting the crystallization, and in the solution of $AlF_3$ at the moment of finishing the crystallization.
***Generation of fine particles: The same a in Experiment 1.

As apparent from Table 2, when the seed crystal was employed at a ratio of 25 $m^2$ per 1 kg of $AlF_3.3H_2O$, the amount of newly precipitated crystal to be shared to the growth of the seed crystal was relatively small, whereas the generation of new fine particles was increased.

By contrast, if the seed crystal was employed at a ratio exceeding 100 $m^2$ per 1 kg of $AlF_3.3H_2O$, the amount of newly precipitated crystal to be shared to the generation of fine particles was decreased to become constant. However, in this case, the degree of crystal growth of seed crystal per crystallization process was very limited, and additionally the concentration of solid material in the slurry was increased, thereby making the operation rather difficult. Accordingly, in order to efficiently manufacture a crystal of large particle size, it is preferable to employ a seed crystal of $AlF_3.3H_2O$ in such a ratio that the total surface area of the seed crystal is in the range of 40-100 $m^2$ per 1 kg of $AlF_3.3H_2O$ to be precipitated.

EXPERIMENT NO. 3

(Effect of fine particles in the seed crystal)

Seed crystal of large particle size, which was obtained by removing fine particles 40 μm or less in average particle size by means of a hydraulic classification from the slurry of $AlF_3.3H_2O$ obtained by performing the same crystallizing process as that used for No. 6 of Experiment No. 1, and fine particles having a particle size of 40 μm or less which was separated from a slurry obtained by performing the same crystallizing process as mentioned above were mixed at the ratios indicated in Table 3, thereby preparing samples of seed crystal differing from each other in content of fine particle of 40 μm or less in diameter. These seed crystals were subjected to crystal growth, and the relationship between the amount of the fine particles in the seed crystal and the generation of fine particles resulted from the precipitation was examined. In this experiment, all of the crystallizer, the agitator, temperature and time were the same as those in Experiment No. 1. Results were shown in Table 3.

TABLE 3

| No. | Seed Crystal 40 μm or Less (%) | Seed Crystal Surface Area ($m^2/kg$) | Seed Crystal Weight (Dry) Large Particle (g) | Seed Crystal Weight (Dry) Fine Particle (g) | Seed Crystal Weight (Dry) Total (g) | $AlF_3$ Super Saturated Solution Initial Concentraion (%) | $AlF_3$ Super Saturated Solution Weight (g) | Share of Crystallization For Growth of Seed Crystal (%) | Share of Crystallization For Generation of Fine Particle (%) |
|---|---|---|---|---|---|---|---|---|---|
| 16 | 3.6 | 75 | 150.0 | 0.0 | 150 | 11.0 | 365 | 97.8 | 2.2 |
| 17 | 5.0 | 76 | 147.8 | 2.2 | 150 | 11.0 | 365 | 92.2 | 7.8 |
| 18 | 7.0 | 77 | 145.0 | 5.0 | 150 | 11.0 | 365 | 64.6 | 15.4 |
| 19 | 10.0 | 79 | 140.0 | 10.0 | 150 | 11.0 | 365 | 62.9 | 37.1 |

NOTE: In No. 16, only large particles obtained by hydraulic classification were employed, but it was found that it contained 3.6% of fine particle having a diameter of 40 μm or less as a result of measurement of the particle size distribution.

As apparent from Table 3, when the content of seed crystal having a diameter of 40 μm or less was more than 5%, the ratio of newly precipitated crystal to be shared to the growth of the fine seed crystal was increased. However, if the content of seed crystal having a diameter of 40 μm or less was controlled to not more than 5%, the growth of fine seed crystal could be inhibited thereby making it possible to obtain crystals of larger particle size.

EXPERIMENT NO. 4

(Relationship between crystallization temperature and crystallization velocity)

A solution comprising 295 g of a super-saturated solution of aluminum fluoride having a concentration of 17%, 145 g of a solution of aluminum fluoride having a concentration of 1.3%, and 163 g of seed crystal having an average particle diameter of 77 μm, and containing not more than 5% of fine particle 40 μm or less in particle diameter and 8.1% of moisture were charged into a crystallizer of the same type as used in Experiment No. 1.

Then, this solution was maintained at the temperatures as indicated in Table 4, and allowed to crystallize over a period of 5 hours while agitating it with a flat-blade type agitator at the blade-tip velocity of 1.3 m/sec. The crystallization ratio was determined by withdrawing a portion of slurry at every one hour, separating solid material from the slurry, and analyzing aluminum concentration. Results are shown in Table 4.

TABLE 4

| No. | Crystallization Temperature (°C.) | Crystallization Time (h) Ratio of Crystallization (%) | | | |
|---|---|---|---|---|---|
| | | 2 | 3 | 4 | 5 |
| 20 | 55 | — | 58.5 | 63.7 | 80.5 |
| 21 | 65 | 74.9 | 84.2 | 87.4 | 88.9 |
| 22 | 75 | 78.4 | 86.7 | 88.9 | 90.5 |
| 23 | 85 | 85.7 | 88.1 | 89.7 | 90.5 |
| 24 | 95 | 86.6 | 88.0 | 89.8 | 89.8 |

As apparent from Table 4, when the crystallization time was over a period of 4 hours, the crystallization ratio become substantially constant at a crystallization temperature of 75° C. or more.

EXAMPLE 1

Seed crystal was prepared as follows.

900 g of a super-saturated solution of aluminum fluoride having a concentration of 17% was charged into a polyethylene wide-mouthed bottle 12 cm in diameter and 2000 cm$^3$ in volume. Then this bottle was immersed in a water bath kept at a temperature of 95° C. The solution was allowed to crystallize over a period of 6 hours while agitating it with a flat-blade type agitator at the blade-tip velocity of 1.3 m/sec. Resultant slurry was then cooled approximately to the room temperature, and classified by using a hydraulic classifier to remove fine particles having a diameter of 40 μm or less. After allowing the solution to stand still, a portion of the supernatant liquid was removed to obtain a slurry containing $AlF_3.3H_2O$ at a concentration of 50%. The average particle diameter of the $AlF_3.3H_2O$ crystal in the slurry was 83 μm.

By using the $AlF_3.3H_2O$ crystal as a seed crystal, the crystal growth of the seed crystal was conducted as follows. 200 g of a slurry containing the above seed crystal was charged into a polyethylene wide-mouthed bottle 12 cm in diameter and 1000 cm$^3$ in volume. Then this bottle was immersed in a water bath kept at a temperature of 95° C.

The slurry was agitated with a flat-blade type agitator having a blade length of 8cm at the blade-tip velocity of 1.3 m/sec. Then, 335 g of a super-saturated solution of aluminum fluoride having a concentration of 17% and 85 g of a solution of aluminum fluoride having a concentration of 1.3% were charged into the slurry thereby obtaining a super-saturated solution having concentration of 11.4%.

Then, this solution was subjected to crystallization over a period of 4 hours. In this case, the total surface area of the seed crystal employed was 40 m$^2$ per 1 kg of newly precipitated $AlF_3.3H_2O$.

The removal of fine particles having a diameter of 40 μm or less was conducted in the same manner as explained above. The remainder of slurry containing large particles was filtered to obtain 202 g of filter cake. This filter cake of large particle size was found to have 7.8% of moisture, and an average particle diameter of 101 μm.

A slurry containing fine particles 40 μm or less in diameter was filtered to obtain a filter cake, which was then dried at a temperature of 105° C., for 4 hours to obtain 4.2 g of fine particles. The amount of the resultant fine particles Was 4.9% based on the total amount of the newly precipitated crystal. The large particles thus obtained were dried at a temperature of 105° C., and dehydrated in two steps, i.e. at 300° C., and at 600° C. to obtain aluminum fluoride anhydride. The resultant aluminum fluoride anhydride was found to contain 1% or less of particles that could be passed through a 44 μm mesh.

EXAMPLE 2

The same processes as those of Example 1 were repeated except that the slurry was agitated at the blade-tip velocity of 0.5 m/sec at the crystallization step, thereby obtaining a seed crystal having an average particle diameter of 89 μm. The seed crystal thus obtained was allowed to grow in the same manner as in Example 1. However, in this case, the total surface area of the seed crystal employed was 60 m$^2$ per 1 kg of newly precipitated $AlF_3.3H_2O$, and 300 g of a slurry containing 50% of water was employed. The slurry contained 312 g of a super-saturated solution of aluminum fluoride having a concentration of 17% and 23 g of a solution of aluminum fluoride having a concentration of 1.3%.

The resultant slurry was subjected to hydraulic classification in the same manner as in Example 1, thereby obtaining 247 g of filter cake of large particles having a diameter of more than 40 μm, which was found to have 7.7% of moisture, and an average particle diameter of 102 μm. When fine particles having a diameter of 40 μm or less was processed in the same manner as in Example 1, 3.4 g (dry weight) of fine particles was obtained. The amount of the fine particles was 4.2% based on the total amount of the newly precipitated crystal.

The large particles thus obtained were dried and dehydrated in the same manner as in Example 1, thereby obtaining aluminum fluoride anhydride. The resultant aluminum fluoride anhydride was found to contain 1% or less of particles that could be passed through a 44 μm mesh.

EXAMPLE 3

The same processes as those of Example 2 were repeated to obtain a seed crystal. The seed crystal thus obtained was allowed to grow in the same manner as in Example 1. However, in this case, the total surface area of the seed crystal employed was 40 m² per 1 kg of newly precipitated AlF₃.3H₂O, and 300 g of a slurry containing 50% of water was employed. The super-saturated solution of aluminum fluoride containing 475 g of a super-saturated solution of aluminum fluoride having a concentration of 17% and 110 g of a solution of aluminum fluoride having a concentration of 1.3% was used in this example.

The resultant slurry was subjected to hydraulic classification in the same manner as in Example 1, thereby obtaining 284 g of filter cake of large particles having a diameter of more than 40 μm, which was found to have 7.8% of moisture, and an average particle diameter of 106 μm. When fine particles having a diameter of 40 μm or less were were as shown at No.4 in Table 5. The sharing ratio of crystallization, and the judgments to the crystal on the basis of Experiments are also shown at No.4 in Table 5.

The large particles obtained as shown at No.4 in Table 5 were used as a seed crystal in another crystallization process, which was conducted under the same conditions as mentioned above. In the same manner, large particles obtained in the previous crystallization process were repeatedly employed as a seed crystal in the next crystallization process, thereby obtaining larger particles. Results of them are shown at Nos. 5 to 7 in Table 5.

TABLE 5

| | Seed Crystal | | | AlF₃ Super Saturated Solution | | Ratio of Crys-talli-zation (%) | Average Particle Diameter | Share of Crystallization | | Judgement | | |
|---|---|---|---|---|---|---|---|---|---|---|---|---|
| No. | Aver-age Par-ticle Dia-meter (μm) | Sur-face Area (m²/ kg) | Weight (Dry) (g) | Initial Concen-tration (%) | Weight (g) | | Diameter of Large Particle (μm) | Growth of Seed Crystal (%) | Genera-tion of Fine Par-ticle (%) | Surface Feature | Genera-tion of Fine Par-ticle | Summary |
| 4 | 78 | 40 | 120 | 11.1 | 700 | 88.6 | 96 | 95.4 | 4.6 | ◎ | ◎ | ◎ |
| 5 | 96 | 40 | 120 | 11.0 | 570 | 88.2 | 115 | 98.1 | 1.9 | ◎ | ◎ | ◎ |
| 6 | 115 | 40 | 150 | 10.9 | 590 | 87.9 | 133 | 98.0 | 2.0 | ◎ | ◎ | ◎ |
| 7 | 133 | 40 | 150 | 11.3 | 510 | 87.4 | 151 | 97.7 | 2.3 | ◎ | ◎ | ◎ | processed in the same manner as in Example 1, 11 g (dry weight) of fine particles was obtained. The amount of the fine particles was 8.9% based on the total amount of the newly precipitated crystal.

The large particles thus obtained were dried and dehydrated in the same manner as in Example 1, thereby obtaining aluminum fluoride anhydride. The resultant aluminum fluoride anhydride was found to contain 1% or less of particles that could be passed through a 44 μm mesh.

EXAMPLE 4

As a primary seed crystal, AlF₃.3H₂O particles containing not more than 5% of fine particles having an average diameter of 40 μm or less and 8.1% of moisture was employed. The total surface area of the seed crystal per 1 kg of newly precipitated AlF₃.3H₂O, the weight (dry basis) of seed crystal employed, the concentration of the slurry at the initial moment of crystallization, and the weight of the super-saturated solution of aluminum fluoride were as shown in Table 5. The slurry was agitated at the blade-tip velocity of 0.7 m/sec by using a flat-blade type agitator. The crystallization was conducted under the same conditions as in Example 1.

Large particles exceeding 40 μm in diameter were separated in the same manner as in Example 1 from the slurry of AlF₃.3H₂O. The average particle sizes of the large particles As shown in Table 5, when the amount of the seed crystal corresponds to 40 m² in total surface area of the seed crystal per 1 kg of newly precipitated AlF₃.3H₂O, it was possible by repeating the crystallization process to obtain large particles having an average particle size of as large as 151 μm. In this case, it was also possible to control the sharing ratio of precipitated material so as to limit the generation of line particles to less than 10%, to allow the most of the precipitated material to be consumed for the growth of large particles. Further, in this case, the degree of the crystal growth to be attained by one crystallization process was found to be as high as about 20 μm, and the surface feature of the crystal thus obtained was also excellent.

The large particles thus obtained were dried and dehydrated in the same manner as in Example 1, thereby obtaining aluminum fluoride anhydride. The resultant aluminum fluoride anhydride was found to contain 1% less of particles that could be passed through a 44 μm mesh.

EXAMPLE 5

A crystallization process was repeated four times by selecting the same conditions as employed in Example 4 with respect to the crystallizer, the shape of the agitator, the blade-tip velocity and the crystallization temperature, with other conditions being selected as indicated in Table 6. Results are shown in Table 6.

TABLE 6

| | Seed Crystal | | | AlF$_3$ Super Saturated Solution | | Ratio of Crystallization (%) | Average Particle Diameter of Large Particle (μm) | Share of Crystallization | | Judgement | | |
|---|---|---|---|---|---|---|---|---|---|---|---|---|
| | Average | | | | | | | Growth | Generation | | | |
| No. | Particle Diameter (μm) | Surface Area (m$^2$/kg) | Weight (Dry) (g) | Initial Concentration (%) | Weight (g) | | | of Seed Crystal (%) | of Fine Particle (%) | Surface Feature | Generation of Fine Particle | Summary |
| 8 | 78 | 75 | 150 | 11.3 | 465 | 88.0 | 90 | 97.7 | 2.3 | ⊚ | ⊚ | ⊚ |
| 9 | 90 | 75 | 300 | 11.1 | 800 | 87.8 | 101 | 96.6 | 3.4 | ⊚ | ⊚ | ⊚ |
| 10. | 101 | 75 | 300 | 11.1 | 720 | 88.5 | 111 | 96.9 | 3.1 | ⊚ | ⊚ | ⊚ |
| 11 | 111 | 75 | 300 | 11.4 | 650 | 89.0 | 121 | 98.2 | 1.8 | ⊚ | ⊚ | ⊚ |

As apparent from Table 6, the results were almost the same as those of Example 4 (Table 5). However, the generation of fine particles resulting from the sharing of precipitation was found to be small.

The large particles thus obtained were dried dehydrated in the same manner as in Example 1 to obtain aluminum fluoride anhydride. The resultant aluminum fluoride anhydride was found to contain 1% or less of particles that could be passed through a 44 μm sieve.

EXAMPLE 6

A crystallization process was repeated four times by setting the blade-tip velocity of a flat-blade type agitator to 2.0 m/sec. and selecting the same conditions as employed in Example 4 with respect to the crystallization drum and the crystallization temperature, with other conditions being selected as indicated in Table 7. Results are shown in Table 7.

μm. At the same time, it was possible to minimize the amount of the generation of fine particles resulting from the sharing of precipitation.

The large particles thus obtained were dried and dehydrated in the same manner as in Example 1 to obtain aluminum fluoride anhydride. The resultant aluminum fluoride anhydride was found to contain 1% or less of particles that could be passed through a 44 μm mesh.

EXAMPLE 7

A crystallization process was repeated four times by setting the blade-tip velocity of a flat-blade type agitator to 1.3 m/sec. and selecting the same conditions as employed in Example 4 with respect to the crystallizer and the crystallization temperature, with other conditions being selected as indicated in Table 8. In this case, the surface area of the seed crystal and the concentration of the super-saturated solution of aluminum fluoride at the moment of initiating the crys-

TABLE 7

| | Seed Crystal | | | AlF$_3$ Super Saturated Solution | | Ratio of Crystallization (%) | Average Particle Diameter of Large Particle (μm) | Share of Crystallization | | Judgement | | |
|---|---|---|---|---|---|---|---|---|---|---|---|---|
| | Average | | | | | | | Growth | Generation | | | |
| No. | Particle Diameter (μm) | Surface Area (m$^2$/kg) | Weight (Dry) (g) | Initial Concentration (%) | Weight (g) | | | of Seed Crystal (%) | of Fine Particle (%) | Surface Feature | Generation of Fine Particle | Summary |
| 12 | 78 | 75 | 150 | 11.2 | 465 | 88.1 | 88 | 93.7 | 6.3 | ⊚ | ○ | ○ |
| 13 | 88 | 75 | 300 | 11.1 | 855 | 88.5 | 99 | 95.2 | 4.8 | ⊚ | ⊚ | ⊚ |
| 14 | 99 | 75 | 300 | 11.0 | 735 | 87.4 | 110 | 94.4 | 5.6 | ⊚ | ○ | ○ |
| 15 | 110 | 75 | 300 | 11.3 | 660 | 88.3 | 120 | 93.9 | 6.1 | ⊚ | ○ | ○ |

As apparent from Table 7, it was possible to obtain a crystal having an average particle diameter of more than 100 tallization were changed as indicated in Table 8. Results are shown in Table 8.

TABLE 8

| No. | Seed Crystal Average Particle Diameter (μm) | Seed Crystal Surface Area (m²/kg) | Seed Crystal Weight (Dry) (g) | AlF₃ Super Saturated Solution Initial Concentration (%) | AlF₃ Super Saturated Solution Weight (g) | Ratio of Crystallization (%) | Average Particle Diameter Large Particle (μm) | Average Particle Diameter Fine Particle (μm) | Growth of Seed Crystal (%) | Share of Crystallization Generation of Fine Particle (%) | Judgement Surface Feature | Judgement Generation of Fine Particle | Summary |
|---|---|---|---|---|---|---|---|---|---|---|---|---|---|
| 16 | 78 | 75 | 300 | 13.4 | 765 | 90.4 | 89 | 14 | 96.3 | 3.7 | ◎ | ◎ | ◎ |
| 17 | 89 | 75 | 300 | 13.3 | 670 | 90.4 | 99 | 12 | 95.5 | 4.5 | ◎ | ◎ | ◎ |
| 18 | 99 | 75 | 300 | 13.1 | 600 | 89.8 | 110 | 12 | 95.1 | 4.9 | ◎ | ◎ | ◎ |
| 19 | 110 | 75 | 300 | 13.1 | 540 | 90.1 | 120 | 11 | 95.2 | 4.8 | ◎ | ◎ | ◎ |

EXAMPLE 8

A crystallization process was repeated four times under the same conditions as employed in Example 7 except that the concentration of the super-saturated solution of aluminum fluoride at the moment of initiating the crystallization were changed as indicated in Table 9. Results are shown in Table 9.

EXAMPLE 9

A crystallization process was repeated four times under the same conditions as employed in Example 7 except that, (1) as a primary seed crystal, $AlF_3 \cdot 3H_2O$ particles having an average particle diameter of 78 μm, and containing not more than 5% of fine particles having an average diameter of 40 μm or less and 8.1% of moisture was employed in an amount

TABLE 9

| No. | Seed Crystal Average Particle Diameter (μm) | Seed Crystal Surface Area (m²/kg) | Seed Crystal Weight (Dry) (g) | AlF₃ Super Saturated Solution Initial Concentration (%) | AlF₃ Super Saturated Solution Weight (g) | Ratio of Crystallization (%) | Average Particle Diameter Large Particle (μm) | Average Particle Diameter Fine Particle (μm) | Growth of Seed Crystal (%) | Share of Crystallization Generation of Fine Particle (%) | Judgement Surface Feature | Judgement Generation of Fine Particle | Summary |
|---|---|---|---|---|---|---|---|---|---|---|---|---|---|
| 20 | 78 | 75 | 150 | 9.0 | 590 | 84.3 | 89 | 13 | 98.0 | 2.0 | ◎ | ◎ | ◎ |
| 21 | 89 | 75 | 150 | 9.0 | 520 | 83.5 | 100 | 13 | 97.3 | 2.7 | ◎ | ◎ | ◎ |
| 22 | 100 | 75 | 180 | 9.1 | 550 | 83.7 | 111 | 12 | 97.9 | 2.1 | ◎ | ◎ | ◎ |
| 23 | 111 | 75 | 180 | 9.0 | 500 | 83.7 | 121 | 12 | 97.8 | 2.2 | ◎ | ◎ | ◎ |

The large particles thus obtained were dried and dehydrated in the same manner as in Example 1 to obtain aluminum fluoride anhydride. The resultant aluminum fluoride anhydride was found to contain 1% or less of particles that could be passed through a 44 μm mesh.

corresponding to 75 m² in total surface area of the seed crystal per 1 kg of newly precipitated $AlF_3 \cdot 3H_2O$, and (2) the temperature of solution was maintained at 83° C. As a result, $AlF_3 \cdot 3H_2O$ crystals having an average particle diameter of 123 μm were obtained. Results are shown in Table 10.

TABLE 10

| No. | Seed Crystal Average Particle Diameter (μm) | Seed Crystal Surface Area (m²/kg) | Seed Crystal Weight (Dry) (g) | AlF₃ Super Saturated Solution Initial Concentration (%) | AlF₃ Super Saturated Solution Weight (g) | Ratio of Crystallization (%) | Average Particle Diameter Large Particle (μm) | Average Particle Diameter Fine Particle (μm) | Share of Crystallization Growth of Seed Crystal (%) | Share of Crystallization Generation of Fine Particle (%) | Judgement Surface Feature | Judgement Generation of Fine Particle | Summary |
|---|---|---|---|---|---|---|---|---|---|---|---|---|---|
| 24 | 76 | 75 | 150 | 11.1 | 460 | 89.1 | 88 | 14 | 98.6 | 1.4 | ⊙ | ⊙ | ⊙ |
| 25 | 88 | 75 | 180 | 11.8 | 500 | 90.3 | 101 | 15 | 98.3 | 1.7 | ⊙ | ⊙ | ⊙ |
| 26 | 101 | 75 | 180 | 11.0 | 430 | 89.9 | 113 | 14 | 97.3 | 2.7 | ⊙ | ⊙ | ⊙ |
| 27 | 113 | 75 | 300 | 11.6 | 600 | 89.0 | 123 | 12 | 98.1 | 1.9 | ⊙ | ⊙ | ⊙ |

The large particles thus obtained were dehydrated in the same manner as in Example 1 to obtain aluminum fluoride anhydride. The resultant aluminum fluoride anhydride was found to contain 1% or less of particles that could be passed through a 44 μm mesh.

EXAMPLE 10

A crystallization process was repeated four times under the same conditions except that, as a primary seed crystal, AlF₃.3H₂O particles having an average particle diameter of 78 μm, and containing act more than 5% of fine particles having an average diameter of 40 μm or less and 8.1% of moisture were employed in an amount corresponding to 50 m² in total surface area of the seed crystal per 1 kg of newly precipitated AlF₃.3H₂O. The crystallization was conducted for 4 hours under the conditions: 12.1% in concentration of AlF₃ at the moment of initiating the crystallization; 93° C. in crystallization temperature; and 1.3 m/sec. In blade-tip velocity. Further Nos. 29–31 in Table 11 were conducted. Results are shown in Table 11. As apparent from Table 11, a crystal growth of about 14 to 16 μm in thickness was recognized in one step of crystallization.

TABLE 11

| No. | Seed Crystal Average Particle Diameter (μm) | Seed Crystal Surface Area (m²/kg) | Seed Crystal Weight (Dry) (g) | AlF₃ Super Saturated Solution Initial Concentration (%) | AlF₃ Super Saturated Solution Weight (g) | Ratio of Crystallization (%) | Average Particle Diameter of Large Particle (μm) | Growth of Seed Crystal (%) | Share of Crystallization Generation of Fine Particle (%) | Judgement Surface Feature | Judgement Generation of Fine Particle | Summary |
|---|---|---|---|---|---|---|---|---|---|---|---|---|
| 28 | 78 | 50 | 120 | 12.1 | 500 | 89.1 | 93 | 95.1 | 4.9 | ⊙ | ⊙ | ⊙ |
| 29 | 93 | 50 | 150 | 11.8 | 535 | 89.3 | 107 | 94.3 | 5.7 | ⊙ | ○ | ○ |
| 30 | 107 | 50 | 150 | 11.8 | 470 | 88.9 | 123 | 93.9 | 6.1 | ⊙ | ○ | ○ |
| 31 | 123 | 50 | 150 | 12.1 | 435 | 88.7 | 138 | 95.7 | 4.3 | ⊙ | ⊙ | ⊙ |

EXAMPLE 11

The amount of seed crystal employed was either 50 m² or 60 m² in total surface area of the seed crystal per 1 kg of newly crystallized $AlF_3 \cdot 3H_2O$. The average particle diameter and weight of the seed crystal were those as indicated in Table 12. By using the seed crystal, the crystallization process was repeated four times in the same manner as employed in Example 10. As a result, $AlF_3 \cdot 3H_2O$ crystals having an average particle diameter of 131 μm were obtained, and a crystal growth of about 13 μm in thickness was recognized in one step of crystallization. Results are shown in Table 12.

(2) A first crystallization

The crystallizing process as mentioned above was repeated by using as a seed crystal the large particles obtained above. As a crystallizing liquid, a solution denoted at No. 37 in Table 13 and comprising a mixture of a super-saturated solution of aluminum fluoride and a solution of aluminum fluoride having a concentration of 1.3% was employed. Other crystallization conditions were as shown below.

TABLE 12

| No. | Seed Crystal | | | $AlF_3$ Super Saturated Solution | | Ratio of Crystallization (%) | Average Particle Diameter of Large Particle (μm) | Share of Crystallization | | Judgement | | |
|---|---|---|---|---|---|---|---|---|---|---|---|---|
| | Average Particle Diameter (μm) | Surface Area (m²/kg) | Weight (Dry) (g) | Initial Concentration (%) | Weight (g) | | | Growth of Seed Crystal (%) | Generation of Fine Particle (%) | Surface Feature | Generation of Fine Particle | Summary |
| 32 | 78 | 60 | 120 | 11.4 | 445 | 88.8 | 91 | 94.7 | 5.3 | ◉ | ○ | ○ |
| 33 | 91 | 60 | 150 | 11.8 | 495 | 89.4 | 104 | 96.9 | 3.1 | ◉ | ◉ | ◉ |
| 34 | 104 | 60 | 150 | 11.3 | 420 | 88.6 | 118 | 97.1 | 2.9 | ◉ | ◉ | ◉ |
| 35 | 118 | 50 | 150 | 11.2 | 445 | 89.2 | 131 | 95.2 | 4.8 | ◉ | ◉ | ◉ |

EXAMPLE 12

(1) Preparation of seed crystal

Crystallization of seed crystal was carried out for 6 hours in the same manner as in Example 1 except that 1200 g of a super-saturated solution of aluminum fluoride having a concentration of 17% was charged into the bottle, and the agitation with the flat-blade type agitator having 8.0 cm blade was conducted at the blade-tip velocity of 1.0 m/sec.

Resultant slurry after crystallization was filtered to obtain 323 g of a filter cake containing 7.7% of moisture. This filter cake was then converted into a slurry having 50% solid, which is then treated with a hydraulic classifier to remove fine particles, and thereafter filtered again. As a result, 317 g of large particles containing 9.6% of moisture and having an average particle diameter of 83 μm was obtained. Details are shown at No. 36 in Table 13.

| Crystallizing device: | The same as in Experiment No. 4 |
|---|---|
| Temperature of slurry: | 93° C. |
| Crystallizing time: | 4 hours |
| Blade-tip velocity: | 1.3 m/sec. |

After finishing the crystallization, the slurry was subjected to classification and filtering thereby to recover large particles and fine particles respectively. The ratio of sharing of newly precipitated crystal between that shared to the growth of seed crystal and that shared to the generation of fine particles was also determined. Additionally, judgments on the surface feature of the crystal were also conducted.

(3) Second to sixth crystallizations

The processes starting from the crystal growth to the classification of fine particles were repeated by using as a seed crystal large particles obtained in the above first crystallization under the same crystallizing conditions as explained above. The crystallization ratio, average particle diameter and sharing of precipitated material in each crystal growth were calculated as shown in Table 13.

TABLE 13

| No. | Seed Crystal | | | $AlF_3$ Super Saturated Solution | | Ratio of Crystallization (%) | Average Particle Diameter | | Share of Crystallization | | Judgement | | |
|---|---|---|---|---|---|---|---|---|---|---|---|---|---|
| | Average Particle Diameter (μm) | Surface Area (m²/kg) | Weight (Dry) (g) | Initial Concentration (%) | Weight (g) | | Large Particle (μm) | Fine Particle (μm) | Growth of Seed Crystal (%) | Generation of Fine Particle (%) | Surface Feature | Generation of Fine Particle | Summary |
| 36 | — | 0 | 0 | 17.0 | 1200 | 86.2 | 83 | 26 | 96.3 | 3.7 | — | — | — |
| 37 | 83 | 60 | 150 | 10.6 | 522 | 88.1 | 92 | 16 | 96.9 | 3.1 | ◉ | ◉ | ◉ |
| 38 | 92 | 70 | 150 | 11.4 | 417 | 89.1 | 103 | 14 | 96.5 | 3.5 | ◉ | ◉ | ◉ |
| 39 | 103 | 70 | 150 | 11.4 | 368 | 89.1 | 111 | 16 | 95.5 | 4.5 | ◉ | ◉ | ◉ |
| 40 | 111 | 80 | 170 | 11.0 | 354 | 89.4 | 120 | 12 | 97.0 | 3.0 | ◉ | ◉ | ◉ |
| 41 | 120 | 70 | 180 | 10.4 | 407 | 68.2 | 128 | 13 | 95.2 | 4.8 | ◉ | ◉ | ◉ |
| 42 | 128 | 70 | 180 | 10.2 | 392 | B7.9 | 136 | 13 | 96.3 | 3.7 | ◉ | ◉ | ◉ |

As apparent from Table 13, it is possible according to this invention to steadily enlarge the particle size of a crystal by repeating the crystallization process without inviting excessive generation of fine particles in the process. At the same time, a crystal having a smooth surface and an excellent feature can be obtained.

Figure 2:
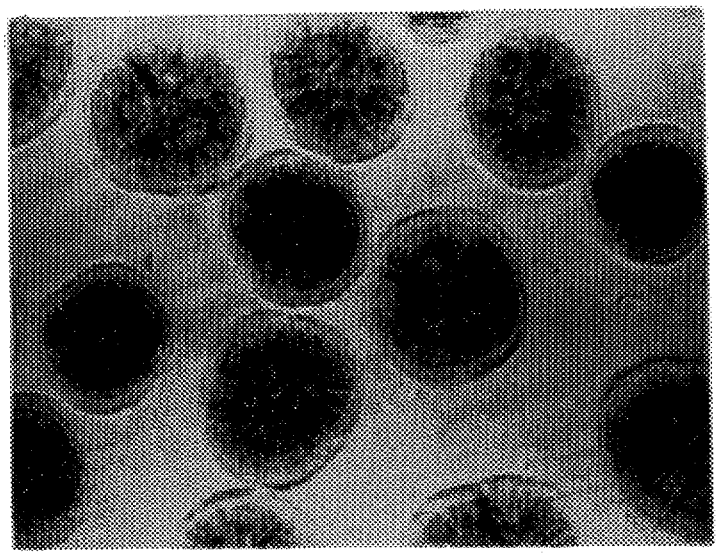
FIG. 2 is an optical microscopic photograph of aluminum fluoride particles shown in FIG. 1.
Figure 3:
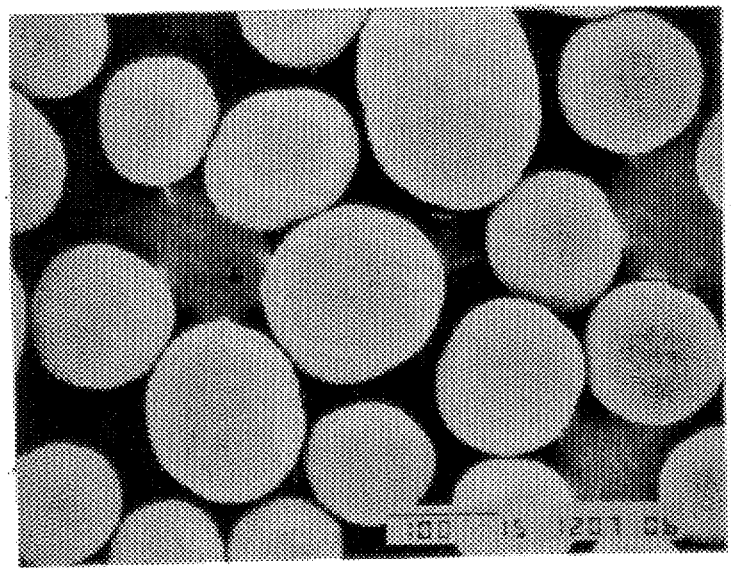
FIG. 3 is a scanning type electron microscopic photograph of aluminum fluoride particles having an average particle diameter of 136 μm as obtained by the present invention.
Figure 4:
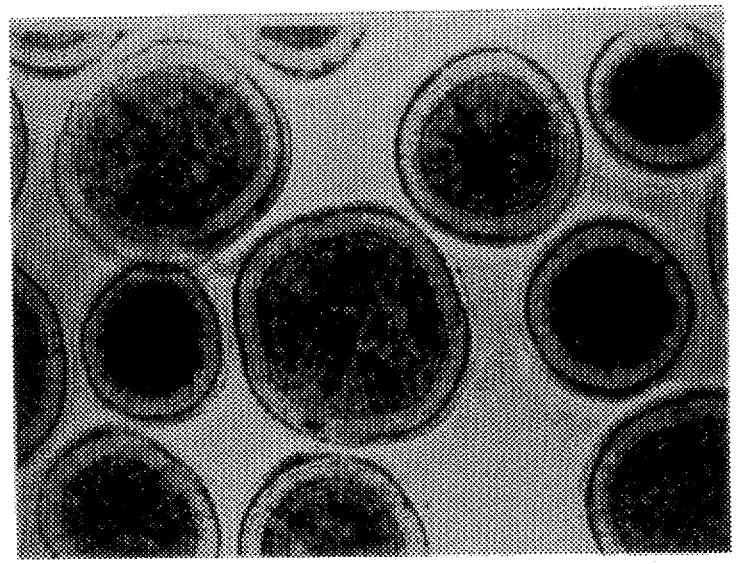
FIG. 4 is an optical microscopic photograph of aluminum fluoride particles shown in FIG. 3.

A scanning type electron microscopic photograph of aluminum fluoride particles having an average particle diameter of 128 μm obtained as indicated at No. 41 in Table 13 is shown in FIG. 1: and an optical microscopic photograph thereof is shown in FIG. 2. Further, a scanning type electron microscopic photograph of aluminum fluoride particles having an average particle diameter of 136 μm obtained as indicated at No. 42 in Table 13 is shown in FIG. 3; and an optical microscopic photograph thereof is shown in FIG. 4.

EXAMPLE 13

A crystallization process was repeated four times under the same conditions as employed in Example 4 except that, the agitation was conducted at the blade-tip velocity of 1.3 m/sec. under the conditions indicated in Table 14. As a result, $AlF_3.3H_2O$ crystals having an average particle diameter of 153 μm were obtained. Results are shown in Table 14.

TABLE 14

| | Seed Crystal | | | $AlF_3$ Super Saturated Solution | | Ratio of Crystallization (%) | Average Particle Diameter | | Share of Crystallization | | Judgement | | |
|---|---|---|---|---|---|---|---|---|---|---|---|---|---|
| No. | Average Particle Diameter (μm) | Surface Area (m²/kg) | Weight (Dry) (g) | Initial Concentration (%) | Weight (g) | | Large Particle (μm) | Fine Particle (μm) | Growth of Seed Crystal (%) | Generation of Fine Particle (%) | Surface Feature | Generation of Fine Particle | Summary |
| 43 | 78 | 40 | 120 | 11.8 | 640 | 88.8 | 95 | 23 | 91.9 | 8.1 | ◉ | ○ | ○ |
| 44 | 95 | 42 | 150 | 11.8 | 630 | 89.1 | 113 | 21 | 92.9 | 7.1 | ◉ | ○ | ○ |
| 45 | 113 | 40 | 150 | 11.2 | 590 | 88.0 | 132 | 21 | 91.6 | 8.4 | ◉ | ○ | ○ |
| 46 | 132 | 40 | 180 | 10.5 | 650 | 87.0 | 153 | 24 | 90.3 | 9.7 | ◉ | ○ | ○ |

EXAMPLE 14

The amount of seed crystal employed was 100 m² in total surface area of the seed crystal per 1 kg of newly precipitated $AlF_3.3H_2O$. By using the seed crystal, the crystallization process was repeated six times in the same manner as employed in Example 13 under the conditions indicated in Table 15. As a result. $AlF_3.3H_2O$ crystals having an average particle diameter of 128 μm were obtained. Results are shown in Table 15.

TABLE 15

| No. | Seed Crystal Average Particle Diameter (μm) | Seed Crystal Surface Area (m²/kg) | Seed Crystal Weight (Dry) (g) | AlF₃ Super Saturated Solution Initial Concentration (%) | AlF₃ Super Saturated Solution Weight (g) | Ratio of Crystallization (%) | Average Particle Diameter Large Particle (μm) | Average Particle Diameter Fine Particle (μm) | Share of Crystallization Growth of Seed Crystal (%) | Share of Crystallization Generation of Fine Particle (%) | Judgement Surface Feature | Judgement Generation of Fine Particle | Judgement Summary |
|---|---|---|---|---|---|---|---|---|---|---|---|---|---|
| 47 | 78  | 100 | 200 | 10.4 | 450 | 86.9 | 86  | 9 | 98.1 | 1.9 | ⊚ | ⊚ | ⊚ |
| 48 | 86  | 100 | 200 | 11.3 | 410 | 88.4 | 95  | 8 | 97.9 | 2.1 | ⊚ | ⊚ | ⊚ |
| 49 | 95  | 100 | 400 | 11.3 | 740 | 88.7 | 104 | 8 | 97.9 | 2.1 | ⊚ | ⊚ | ⊚ |
| 50 | 104 | 100 | 400 | 11.1 | 690 | 88.3 | 111 | 8 | 97.5 | 2.5 | ⊚ | ⊚ | ⊚ |
| 51 | 111 | 100 | 400 | 10.7 | 670 | 87.3 | 119 | 8 | 97.3 | 2.7 | ⊚ | ⊚ | ⊚ |
| 52 | 119 | 100 | 400 | 10.7 | 630 | 87.7 | 128 | 9 | 96.9 | 3.1 | ⊚ | ⊚ | ⊚ |

EXAMPLE 15

A crystallization process was repeated six times under the same conditions as employed in Example 13 except that, as a primary seed crystal, AlF₃.3H₂O particles having an average particle diameter of 78 μm, and containing not more than 5% of fine particles having an average diameter of 40 μm or less and 8.1% of moisture were remployed under the conditions indicated in Table 16. As a result, large AlF₃.3H₂O crystals having an average particle diameter of 141 μm were obtained. Results are shown in Table 16.

The agitation during the crystallization was conducted by using a flat-blade type agitator having a blade length of 8 cm at the blade-tip velocity of 2.1 m/sec. The slurry of AlF₃.3H₂O thus obtained was subjected to classification by using a hydraulic classifier to separate fine particles having a diameter of 40 μm or less, and then filtered to obtain a filter cake. As a result, the filter cake comprising AlF₃.3H₂O particles having an average particle diameter of 58 μm, and containing not more than 5% of fine particles having an average diameter of 40 μm or less and 8.1% of deposited

TABLE 16

| No. | Seed Crystal Average Particle Diameter (μm) | Seed Crystal Surface Area (m²/kg) | Seed Crystal Weight (Dry) (g) | AlF₃ Super Saturated Solution Initial Concentration (%) | AlF₃ Super Saturated Solution Weight (g) | Ratio of Crystallization (%) | Average Particle Diameter Large Particle (μm) | Average Particle Diameter Fine Particle (μm) | Share of Crystallization Growth of Seed Crystal (%) | Share of Crystallization Generation of Fine Particle (%) | Judgement Surface Feature | Judgement Generation of Fine Particle | Judgement Summary |
|---|---|---|---|---|---|---|---|---|---|---|---|---|---|
| 53 | 78  | 75 | 300 | 14.7 | 670 | 91.0 | 89  | 14 | 93.9 | 6.1 | ⊚ | o | o |
| 54 | 89  | 75 | 300 | 14.9 | 570 | 91.7 | 99  | 14 | 91.7 | 8.3 | ⊚ | o | o |
| 55 | 99  | 75 | 300 | 14.7 | 520 | 91.5 | 110 | 13 | 92.4 | 7.6 | ⊚ | o | o |
| 56 | 110 | 75 | 600 | 15.1 | 920 | 91.8 | 120 | 15 | 91.2 | 8.8 | ⊚ | o | o |
| 57 | 120 | 75 | 600 | 14.9 | 860 | 91.5 | 13  | 13 | 91.6 | 8.4 | ⊚ | o | o |
| 58 | 130 | 75 | 600 | 14.9 | 800 | 91.6 | 141 | 13 | 90.3 | 9.7 | ⊚ | o | o |

EXAMPLE 16

Seed crystal was prepared as follows. 600 g of a supersaturated solution of aluminum fluoride having a concentration of 17% was charged into a polyethylene wide-mouthed bottle 9 cm in diameter and 1000 cm³ in volume. Then the crystallization of AlF₃.3H₂O was conducted in the same manner as in Example 1.

water was obtained and used as a primary seed crystal. The crystal growth of seed crystal was carried out by repeating a crystallization process four times under the same conditions as in Example 13, thereby obtaining large AlF₃.3H₂O particles having an average particle diameter of 129 μm. The AlF₃.3H₂O particles thus obtained were spherical in shape and high in surface denseness. Results are shown in Table 17.

TABLE 17

| No. | Seed Crystal Average Particle Diameter (μm) | Seed Crystal Surface Area (m²/kg) | Weight (Dry) (g) | AlF₃ Super Saturated Solution Initial Concentration (%) | Weight (g) | Ratio of Crystallization (%) | Average Particle Diameter Large Particle (μm) | Average Particle Diameter Fine Particle (μm) | Share of Crystallization Growth of Seed Crystal (%) | Share of Crystallization Generation of Fine Particle (%) | Judgement Surface Feature | Judgement Generation of Fine Particle | Summary |
|---|---|---|---|---|---|---|---|---|---|---|---|---|---|
| 59 | 58 | 40 | 100 | 11.4 | 750 | 88.3 | 75 | 24 | 93.9 | 6.1 | ◉ | ○ | ○ |
| 60 | 75 | 40 | 100 | 11.4 | 580 | 88.1 | 93 | 22 | 92.8 | 7.2 | ◉ | ○ | ○ |
| 61 | 93 | 40 | 100 | 11.3 | 480 | 87.5 | 111 | 22 | 92.1 | 7.9 | ◉ | ○ | ○ |
| 62 | 111 | 40 | 150 | 11.4 | 590 | 87.4 | 129 | 21 | 90.7 | 9.3 | ◉ | ○ | ○ |

EXAMPLE 17

The AlF₃·3H₂O filter cake obtained in Example 10 was dried in a hot air circulating type thermostatic chamber (300° C.) for one hour to remove water therein. As a result, this aluminum fluoride was dehydrated to have a composition of AlF₃·3H₂O. This aluminum fluoride was transferred to a platinum dish, which was then kept in an electric furnace to be heated at 600° C. for one hour thereby to finish a complete dehydration thereof. The content of aluminum fluoride, average particle size, amount of particles passed through a 44 μm mesh, bulk density, angle of repose, and factor "a" of the empirical equation relating pressure to powder volume were measured on this sample, and samples obtained in Examples 1 and 3. The factor "a" of the compression fluid equation is identical to the constant "a" of the following empirical equation about the compression of particles, which represents a relationship between a pressure applied from outside to a particle layer and a volume change. Smaller the value of "a", larger the fluidity of particles (Particle technology handbook, Japan Particle Technology Society, Daily Industry Newspaper Co., pages 145–146, Feb. 28, 1986).

$P/C = 1/ab + P/a$ $P$ ... Pressure (Pa)

$C$ ... Degree of decrease in apparent volume (–)

$C = (V_0 - V)/V_0$ $V_0$ ... Initial volume ($m^3$)

$V$ ... A volume under pressure ($m^3$)

$a, b$ ... Constants

Results are shown in Table 18.

In this Table 18, No. 63 indicates the results obtained in Example 1; No. 64 indicates the results obtained in Example 3; to produce aluminum fluoride anhydride the product of A Co. was aluminum fluoride anhydride obtained by a wet method; and the product of B Co. was aluminum fluoride anhydride obtained by a dry method.

TABLE 18

| No. | AlF₃ (%) | Average Particle Diameter (μm) | 44 μm> (%) | Bulk Density Loose (g/cm³) | Bulk Density Packed (g/cm³) | Angle of Repose Injection Method (°) | Angle of Repose Exhaust Method (°) | Factor "a" |
|---|---|---|---|---|---|---|---|---|
| 63 | 98.3 | 103 | 0.0 | 0.78 | 0.89 | 31 | 32 | 0.140 |
| 64 | 98.3 | 107 | 0.0 | 0.78 | 0.90 | 31 | 32 | 0.135 |
| 65 | 98.5 | 140 | 0.0 | 0.80 | 0.90 | 30 | 32 | 0.129 |
| Product of A Co. (Wet Method) | 97.5 | 63 | 7.9 | 0.75 | 0.94 | 35 | 42 | 0.207 |
| Product of B Co. (Dry Method) | 91.4 | 95 | 0.0 | 1.39 | 1.64 | 33 | 35 | 0.152 |

As shown in this Table 18, as far as the angle of repose and the constant "a" are concerned, the products Nos. 63 to 65 according to this invention are equal to or lower than those of aluminum fluoride anhydride obtained by the dry method. As apparent from these results, aluminum fluoride anhydride having a large average diameter to be obtained according to the wet method of this invention is excellent in fluidity, and generates only a very small amount of dust since it contains not more than 1% of fine particles 44 μm or less in diameter.

What is claimed:

1. A method of manufacturing aluminum fluoride anhydride having an average particle diameter of 100 μm or more, which comprises the steps of:

(a) preparing an initial super-saturated solution of aluminum fluoride;

(b) preparing primary AlF$_3$.3H$_2$O seed crystals containing not more than 5 weight % of fine particles of 40 μm or less in particle diameter;

(c) adding said AlF$_3$.3H$_2$O seed crystals into the super-saturated solution of aluminum fluoride in an amount such that a total surface area of all the added seed crystals is in a range of 40–100 m$^2$ per 1 kg of AlF$_3$.3H$_2$O calculated as the amount of AlF$_3$.3H$_2$O necessary to be precipitated from the initial super-saturated solution of AlF$_3$ to reduce the concentration of AlF$_3$ in the initial super-saturated solution to 1.6 weight %; thereafter, (d) if the concentration of the AlF$_3$ dissolved in the resultant super-saturated solution after addition of said seed crystals is above 13 weight % or below 9 weight %, adjusting the concentration to 9 to 13 weight %; thereafter (e) heating the resultant aluminum fluoride super-saturated solution to a temperature ranging from 75° to 106° C.; thereafter (f) allowing crystals to precipitate from the resultant super-saturated solution of aluminum fluoride under agitation, using a batch crystallization method in a crystallizer;

(g) repeating at least once the steps of (c) to (f) by using the crystals obtained in the step (f) and containing not more than 5 weight % of fine particle of 40 μm or less in particle diameter as seed crystals;

(h) separating AlF$_3$.3H$_2$O having an average particle diameter of 100 μm or more from a resultant slurry of AlF$_3$.3H$_2$O after crystallization;

(i) drying the AlF$_3$.3H$_2$O thus separated; and (j) dehydrating the AlF$_3$.3H$_2$O thus dried to remove combined water to produce aluminum fluoride anhydride; and wherein the aluminum fluoride anhydride has a fluidity factor "a" which is less than 0.135, where fluidity factor "a" is a constant defined by the following empirical equation:

$P/C = 1/ab + P/a$ $P \ldots$ = pressure $(Pa)$ $C \ldots$ = Degree of decrease in apparent volume $(-)$ defined by $C = (Vo - V)/Vo$ $Vo$ = initial volume $(m^3)$ $V$ = A volume under pressure $(m^3)$ $a, b$ = Constants.

2. The method according to claim 1, wherein for said heating step, the temperature ranges from 85° to 95° C.

3. The method according to claim 1, wherein in step (f), said resultant super-saturated solution of aluminum fluoride is agitated by using a blade so as to prevent AlF$_3$.3H$_2$O from accumulating at the bottom of the crystallizer.

4. The method according to claim 1, wherein said seed crystals are spherical in shape.

5. The method according to claim 1, wherein said aluminum fluoride anhydride obtained after the dehydrating step contains 1% or less of particles passing through a 44 μm sieve.

6. The method according to claim 1, wherein said AlF$_3$.3H$_2$O seed crystals containing not more than 5 weight % of fine particles of 40 μm or less in particle diameter are prepared from the slurry containing 30% or more of AlF$_3$.3H$_2$O obtained as a result of crystallization step (f).

7. The method according to claim 1, wherein said AlF$_3$.3H$_2$O seed crystals containing not more than 5 weight % of fine particles of 40 μm or less in particle diameter are prepared from the filter cake obtained from a slurry resulting from the crystallization step (f).

8. The method according to claim 1, wherein said step (g) is repeated until 60 weight % or more of AlF$_3$.3H$_2$O obtained from the crystallization is enlarged to have a particle diameter of 100 μm or more.

9. A method of manufacturing aluminum fluoride anhydride having a particle diameter of 100 μm or more in average and, which comprises the steps of:

preparing an initial super-saturated solution of aluminum fluoride;

preparing AlF$_3$.3H$_2$O seed crystals containing not more than 5 weight % of fine particles of 40 μm or less in particle diameter;

adding said AlF$_3$.3H$_2$O seed crystals into the super-saturated solution of aluminum fluoride in an amount such that a total surface area of all the added seed crystals is in a range of 40–100 m$^2$ per 1 kg of AlF$_3$.3H$_2$O calculated as the amount of AlF$_3$.3H$_2$O necessary to be precipitated from the initial super-saturated solution of AlF$_3$ to reduce the concentration of AlF$_3$ in the initial super-saturated solution to 1.6 weight %; thereafter, if the concentration of the AlF$_3$ dissolved in the resultant super-saturated solution after the addition of said seed crystals is above 13 weight % or below 9 weight %, adjusting the concentration to 9 to 13 weight %; thereafter heating the resultant aluminum fluoride super-saturated solution to a temperature ranging from 75° to 106° C.; thereafter allowing crystals to precipitate from the resultant aluminum fluoride super-saturated solution, while agitating, by way of a batch crystallization method in a crystallizer;

separating AlF$_3$.3H$_2$O having an average particle diameter of 100 μm or more from a resultant slurry of AlF$_3$.3H$_2$O after crystallization;

drying the AlF$_3$.3H$_2$O thus separated; and dehydrating the AlF$_3$.3H$_2$O thus dried to remove combined water to produce aluminum fluoride anhydride; and wherein the aluminum fluoride anhydride has a fluidity factor "a" which is 0.14 or less, where fluidity factor "a" is a constant defined by the following empirical equation:

$P/C = 1/ab + P/a$ $P$ = Pressure (Pa)

$C$ = Degree of decrease in apparent volume (-) defined by $C = (V_o - V)/V_o$ $V_o$ = initial volume ($m^3$)

$V$ = A volume under pressure ($m^3$)

$a, b$ = Constants.

10. The method according to claim 9, wherein said aluminum fluoride anhydride is spherical in shape and smooth in surface texture.

11. The method according to claim 9, wherein said aluminum fluoride anhydride obtained after the dehydrating step contains 1 weight % or less of particles passing through a 44 μm sieve.

12. The method according to claim 9, wherein for said heating step, the temperature ranges from 85° to 95° C.

13. The method according to claim 9, the crystal precipitation step, said resultant super-saturated solution of aluminum fluoride is agitated by using a blade so as to prevent $AlF_3 \cdot 3H_2O$ from accumulating at the bottom of the crystallizer.

14. The method according to claim 9, wherein seed crystals having an average diameter of about 80 μm are used so that large crystals having a particle diameter of 100 μm or more are obtained in one crystallizing process.

* * * * *